July 17, 1951
M. F. SASGEN
2,561,139
WINCH, HOIST AND THE LIKE
Filed Jan. 16, 1948
2 Sheets-Sheet 1
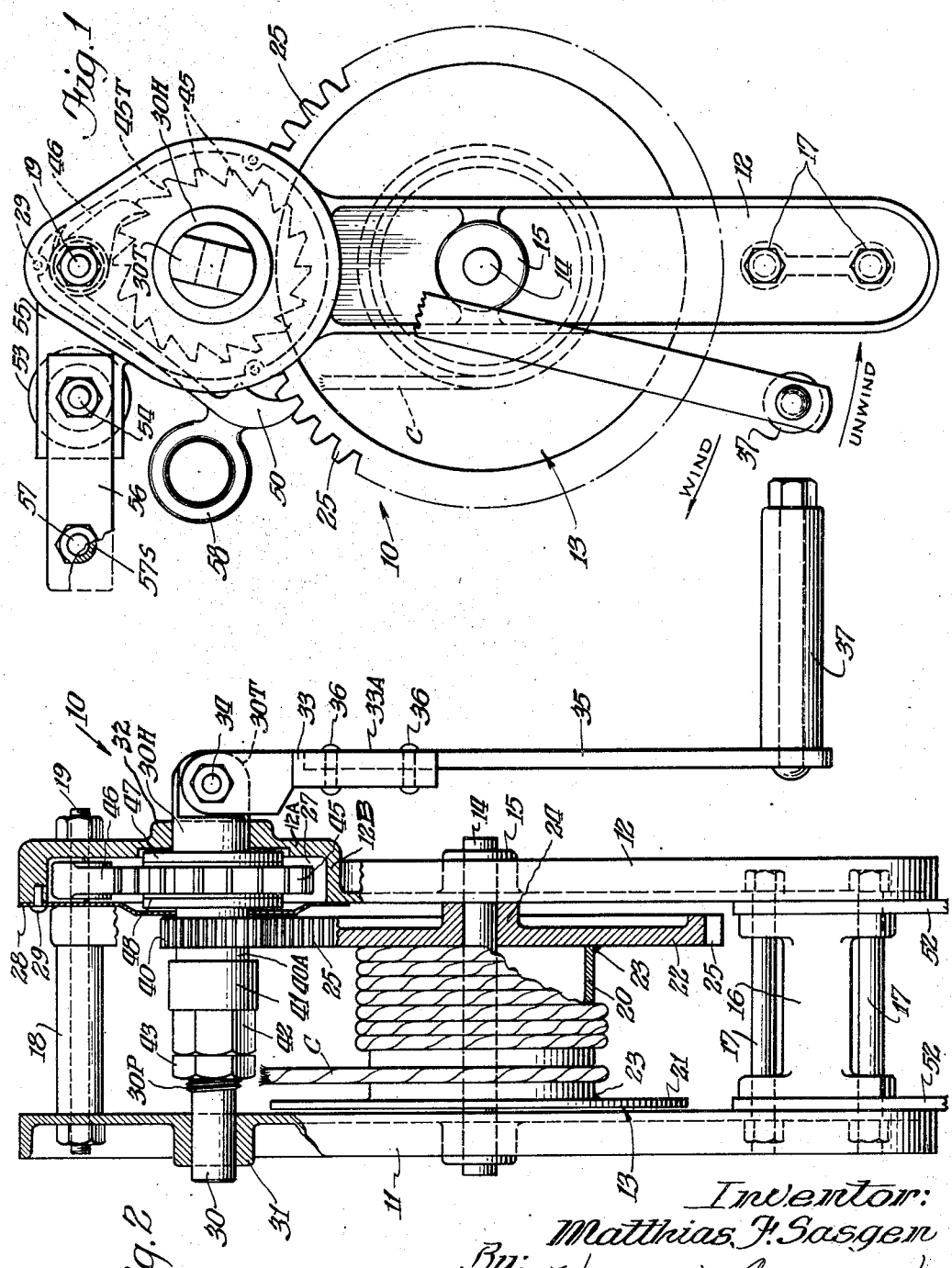

July 17, 1951     M. F. SASGEN     2,561,139
WINCH, HOIST AND THE LIKE
Filed Jan. 16, 1948     2 Sheets-Sheet 2
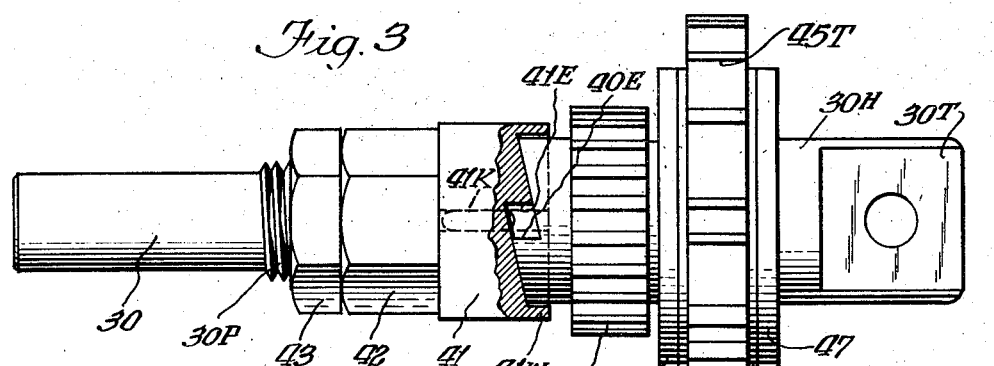
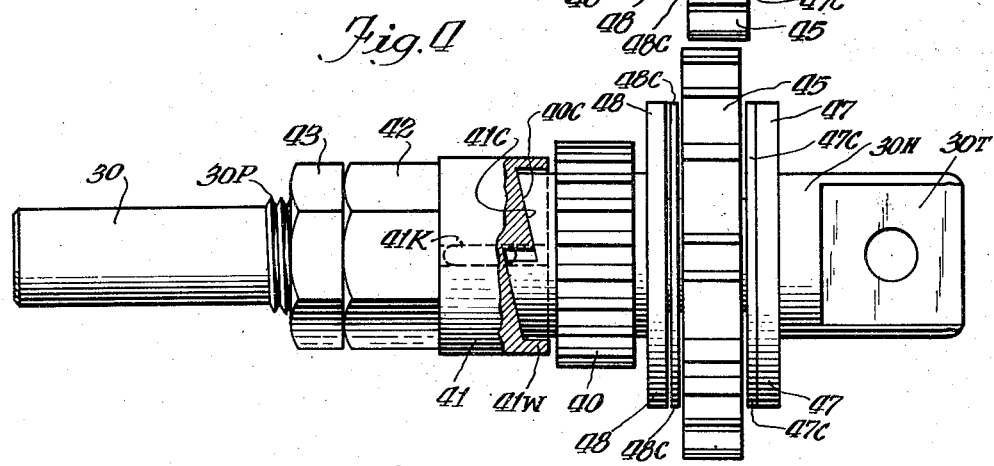
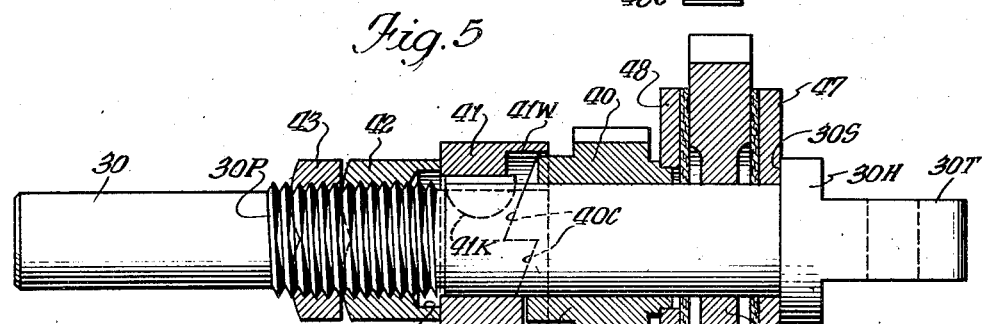
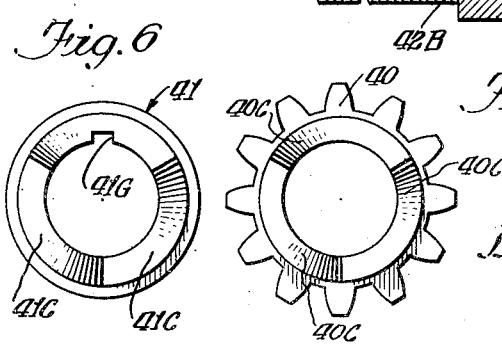
Inventor:
Matthias F. Sasgen
By: Wallace & Cannon
Atty's Patented July 17, 1951

2,561,139

UNITED STATES PATENT OFFICE 2,561,139

WINCH, HOIST, AND THE LIKE

Matthias F. Sasgen, River Forest, Ill., assignor to Sasgen Derrick Co., Chicago, Ill., a corporation of Illinois Application January 16, 1948, Serial No. 2,657

2 Claims. (Cl. 254—186)

This invention relates to winches, hoists and like apparatus, and particularly the invention relates to such apparatus wherein the lowering of the load is controlled by an automatic braking action that requires positive actuation of the apparatus in a lowering direction.

In the patent to Jesse M. Benson, No. 2,254,989, patented September 2, 1941, there is disclosed a winch or hoisting apparatus that embodies an advantageous safety arrangement that tends to minimize the risk normally involved in hoisting of heavy loads or in raising and lowering scaffolds and the like, and in my copending application Serial No. 745,165 filed May 1, 1947, an improved structure is disclosed which serves to increase the safety of operation of winches, hoists and apparatus such as that illustrated in the aforesaid Benson patent.

The safety feature that is thus disclosed in the aforesaid Benson patent comprises an automatic brake that is effective in a load-lowering operation to apply braking forces to the drum in such a manner as to require actuation of the operating means such as a crank handle in a lowering direction in order to cause lowering of the load. In the use of hoists or winches of the aforesaid character in the field it has been found that workmen place great reliance in the automatic braking action that is attained as aforesaid in the winches or hoists made under and in accordance with the Benson patent, and such reliance is in many instances such as to lead to careless manipulation of the apparatus, and in my aforesaid copending application, an improved structure is disclosed that insures that careless or unskilled operation cannot adversely affect the braking function in such apparatus.

In my aforesaid copending application as well as in the aforesaid Benson patent, the safety braking arrangements entail the use of a friction brake that is applied through the action of a screw and nut mechanism, and it has been found that in long continued use of such structures there may be objectionable wear of the braking surfaces as well as the threads of the screw and nut structure, and to enable compensation for such wear to be readily, easily and safely accomplished is the primary object of the invention. As a further factor in connection with such wear, it has in many instances been found that where metal-to-metal braking couples have been used in such winches, the braking or control action has been somewhat jerky or irregular, and yet, with the prior structures, the wide range of wear that is involved when composition braking surfaces are to be employed has rendered it impractical to utilize such composition braking elements in safety winches. It is therefore another object of this invention to enable composition brake material, or other smooth acting but relatively fast wearing braking materials, to be advantageously used in such safety winches.

Other and related objects are to accomplish the foregoing in such a way as to attain the same increased safety of operation that is inherent in the structure disclosed in my aforesaid copending application; to enable the major elements of the brake applying means to be formed separately from the operating or crank shaft of the winch; to so form and relate the elements of such brake applying means to be made in such a way as to prevent locking thereof in an ineffective relation; and to simplify assembly, maintenance and adjustment of such structure.

Other and further objects of the present invention will be apparent from the following description and claims and are illustrated in the accompanying drawings which, by way of illustration show a preferred embodiment and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings:

Fig. 1 is an end elevational view of a winch embodying the features of the invention and showing the crank handle in safety position;

Fig. 2 is a side elevational view taken partially in transverse section and showing the winch with the crank handle in its normal or operating position;

Figs. 3 and 4 are fragmentary sectional views showing the parts of the brake operating mechanism in different positions;

Fig. 5 is a complete sectional view taken of the brake and brake operating structure; and Figs. 6 and 7 are end views of the opposed cam surface ends of two elements of the brake operating structure.

In the form chosen for disclosure herein the invention is embodied in a relatively small or light winch 10 having the operating means mounted permanently on the winch frame and adapted, for example, for use in raising and lowering a scaffold or the like, and as will hereinafter be described in detail the winch 10 has three safety features that cooperate in attaining safe operation even in the hands of an unskilled operator. Thus, as will be evident in Figs. 1 and 2, the winch 10 has a pair of elongated and vertically disposed side frames 11 and 12 connected together in spaced relation to afford space therebetween within which a winding drum 13 is rotatably supported on a transverse drum shaft 14 that extends between and is mounted in suitable bearing bosses 15 formed on the respective side frames 11 and 12. At their lower ends the side frames 11 and 12 are connected in the desired spaced relation by a spacer bar 16 and connecting bolts 17, while at their upper ends, a spacer sleeve 18 and a connecting bolt 19 serve to hold the frames 11 and 12 in the desired relation.

The drum 13 as herein shown comprises a cylindrical barrel 20 having a plain flange 21 and a driving or gear flange 22 secured to opposite ends thereof as by welding at 23, and the flanges 21 and 22 have central hubs 24 that embrace the shaft 14 and afford the desired rotatable bearings for the drum 13. The gear flange 22 in the present instance has external gear teeth 25 formed about the periphery thereof, and the gear flange 22 is disposed so as to be adjacent to the side frame 12, which is termed the crank frame of the winch, and this crank frame 12 is arranged to support, and in part to house, the actuating and control mechanism whereby the drum movements are controlled. Thus the side frame 12 is so formed at its upper end as to afford a chamber 27 that is disposed outwardly, or to the right in Fig. 2, from the outermost face of the gear flange 22, and this chamber is defined by a right hand wall 12A and side flanges 12B so as to open inwardly of the winch, or the left in Fig. 2. The open inner or left hand face of the chamber 27, Fig. 2, is closed by a closure plate 28 that is held in position by pins 29, so that the chamber 27 affords a housing for the major elements of a safety braking mechanism as will hereinafter be described in detail.

In affording the safety braking mechanism as well as an actuating means for winding or unwinding a cable C on the drum 13, such means are mounted permanently on the frame of the winch, rather than as a separate unit or attachment as shown in the aforesaid Benson patent, but it will be recognized that the features of the present invention may be utilized in such a separate unit or attachment. Thus, an actuating shaft 30 is extended through the two side frames 11 and 12 so as to pass through the chamber 27 somewhat above the upper edge of the gear flange 22, and the left hand end of the shaft 30 is rotatably supported in a hub 31 formed on the side frame 11, while an enlarged cylindrical head 30H on the other end of the shaft 30 is rotatably supported within an outwardly projecting hub 32 formed on the wall 12A of the chamber 27. At its outer or left hand end the cylindrical head 30H has a radially related tongue 30T that projects to the right and is embraced by the bifurcated end of a handle-supporting casting 33, the casting 33 being pivoted to the tongue 30T by a pivot bolt 34 so as to permit reversal of the handle from the operating position of Fig. 2 to the safety position of Fig. 1. The handle casting 33 has a radial arm portion 33A in which a radial arm 35 is secured by rivets 36, and at the end of the arm 35 a laterally projecting crank handle 37 is mounted. Thus when the handle 37 is in the operating position shown in Fig. 2, the operator may grasp the handle 37 and impart rotative movements to the shaft 30, and such movements are effective to cause operation of the winding drum 13 as well as the safety braking mechanism.

In attaining such operation, the shaft 30 has a pinion 40 mounted thereon for free rotative and longitudinal sliding movement and this pinion 40 is arranged so as to mesh with the gear teeth 25 of the gear flange 22.

At its left hand end, the pinion 40 has a reduced sleeve portion 40A, the end of which is formed to afford a plurality of gradually sloping cam surfaces 40C. Just to the left of the sleeve portion 40A, a cam head 41 is mounted on the shaft 30 so as to be adjustable longitudinally thereon, and a key 41K seated in the shaft 30 engages a groove 41G in the head 41 to hold the same against rotation on the shaft 30. The cam head 41 is of a diameter somewhat greater than the sleeve portion 40A, and at its right hand end the head 41 has an annular wall 41W extended therefrom so as to loosely surround that portion of the sleeve portion 40A on which the cam surfaces 40C are formed, thereby to protect such surfaces from the entry of stones or other objectionable foreign matter. Within the wall 41W, the cam head 41 has a plurality of cam surfaces 41C formed thereon so as to be complemental and opposed to the cam surfaces 40C, and in the present instance three such cam surfaces are formed on each member so as to be disposed in endwise opposed relation. The cam surfaces each extend through 120°, and each cam surface terminates in an end surface, as 40E or 41E, that is in a radial relation with respect to the axis of the shaft 30.

To the left of the cam head 41, an adjusting nut 42 and a lock nut 43 are disposed on the shaft 30 in engagement with a threaded portion 30P so that the cam head 41 may be adjusted toward and away from the gear 40 through a limited range. Throughout such range, the nut 42 clears the key 41K by reason of a counterbore 42B formed in the right hand end of the nut 42, while the wall 41W and the sleeve portion 40A are so related in length that throughout such adjustment the end of the wall 41W does not contact the adjacent side edges of the teeth of the pinion 40.

To the right of the pinion 40, and within the chamber 27, a safety ratchet 45 is rotatably mounted on the shaft 30. A safety pawl 46, pivoted on the bolt 19 within the chamber 27, extends to the right in Fig. 1, and is arranged to engage teeth 45T of the ratchet 45 to prevent rotation of the ratchet 45 in a counter-clockwise or unwinding direction, Fig. 1. The ratchet 45 has a central web 45W that engages a smooth or cylindrical surface of the shaft 30, and the wider flange portion of the ratchet 45 outwardly of the web 45W is arranged to afford opposite faces formed flat and parallel so as to be disposed in planes perpendicular to the axis of the shaft 30, and these annular flat faces are utilized as friction clutch surfaces. Thus a metallic friction disc 47 is rotatably mounted on the shaft 30 between the ratchet 45 and an annular hand end of the head 30H. On the other or left hand side of the ratchet 45 a metallic friction disc 48 is mounted with a press fit on an annular rabbeted portion formed on the right hand end, Fig. 5, of the pinion 40 so that the friction disc 48 may be forced to the right or in a clamping or braking direction by endwise movement of the pinion 40. Between the discs 47 and 48 and the adjacent faces of the ratchet 45, composition friction discs 47C and 48C are respectively disposed in a loose relation on the shaft 30 so that they may be clamped between the discs 47 and 48 and the ratchet to attain the desired smooth braking action.

When the winch 10 is being used for supporting a load, the cable C will of course apply the load to the drum 13 in what may be termed an unwinding direction so as to resist winding movement of the drum, and hence this load or force acts to hold the pinion 40 against rotation in a winding direction, and the lead of the cam surfaces 40C and 41C is such that when the crank handle 37 is operated in a clockwise or winding direction, Fig. 1, the effect will be to force the cam surfaces 41C along the cam surfaces 40C so as to shift the pinion 40 to the right, Fig. 2, thereby to cause the pinion 40 to move from its released position of Fig. 4 to the clamped or braking position of Figs. 3 and 5. With this arrangement, the load will tend to produce a similar right hand movement of the pinion 40 when the shaft 30 is held against rotation, since under such circumstances the pinion 40 will tend to move counter-clockwise, Fig. 1, so as to move its cam surfaces 40C along the then stationary cam surfaces 41C. This will clamp the friction disc 47, 47C, 48 and 48C with respect to the ratchet 45. Thus, the operation of the handle 37 in a winding direction serves through the cam surface 40C and 41C to engage friction clutch elements that connect the shaft 30, the ratchet 45 and the pinion 40 as a unit which transmits the winding motion of the drum 13. As such winding progresses, the pawl 46 rides over the teeth 45T of the ratchet, thereby to prevent retrograde motion of the ratchet, and this of course serves as a safety to prevent undesired unwinding of the drum. In addition, a safety pawl 50 is pivoted on the bolt 19 just to the left of the plate 28, Fig. 2, so as to project to the left, Fig. 1, and this pawl 50 rides over the teeth 25 of the gear flange 22 so as to hold the drum 13 against unwinding movement. It should be noted that while the safety pawl 50 is desirable, and affords an additional safety feature, it is common practice in winches of this character to rely entirely upon the ratchet 45 to hold the drum against unwinding movement, and to utilize the pawl 50 or its equivalent only in a brake or clutch releasing operation as will hereinafter be described.

In the use of the winch 10, as for example in the raising or lowering of a scaffold, the scaffold is connected to the lower spacer bolts 17 by means including hanger bars 52. The cable C has one end connected to the drum 13 and is then extended upwardly past and to the right, Fig. 1, of a cable guide spool 53 that is journaled on a bolt 54 that is extended between arms 55 that are extended to the left, Fig. 1, from the upper ends of the respective frames 11 and 12. Additional arms 56 are secured to the arms 55 by the bolt 54 so as to project additionally to the left, and a hand grip including a bolt 57 and a sleeve 57S is extended between the arms 56 so as to be disposed above an operating ring 58 formed adjacent to the end of the safety pawl 50. Thus the operator may grasp or rest one hand on the hand grip 57 while using one finger or the thumb of this hand to raise or release the pawl 50 when this is required to enable the load to be lowered.

With respect to the attainment of such lowering of the load, it should be observed that the pawl 46 is housed within the chamber 27 so as to be engaged with the ratchet 45 at all times, and hence the ratchet 45 is held against retrograde movement. Thus, in order to enable the desired lowering movement of the load to be attained, the pinion 40 must be released from the ratchet 45 in such a way as to permit controlled retrograde or lowering rotation of the pinion 40 with respect to the then stationary ratchet 45. It will be recognized that in the course of the preceding raising or lifting operation the operation of the crank handle 37 in a winding direction has been resisted by the load through the pinion 40 so as to thereby tightly clamp the friction discs 47, 47C, 48 and 48C between the shoulder 30S and pinion 40 and the opposed annular faces of the ratchet 45, and hence as a preliminary to a load lowering operation it is usually necessary to release or substantially reduce the clamping forces that have thus been set up between the various clutch elements. Thus while the safety pawl 50 is allowed to remain in its engaged or safety position, the crank handle 37 is turned slightly in a reverse or lowering direction, thereby to cause the cam surfaces 41C to be backed away from the cam surfaces 40C, thereby to free the pinion 40. This constitutes a releasing operation of the handle 37 and serves to release the previously established clamping forces between the various friction clutch elements, thereby to free the pinion 40 from the restraining influence of the then stationary ratchet 45. When such release of the pinion 40 has thus been accomplished the safety pawl 50 is still effective, thereby to hold the drum 13 against unwinding movement, and to initiate the desired lowering movement, the pawl 50 must be released. When this is to be done, the operator normally holds the crank handle 37 with one hand, while grasping the hand grip 57 and the pawl 50 with the other hand in the manner hereinbefore described. When the load is relatively small, the pawl 50 may be withdrawn without utilizing the crank handle to release the load or force on the pawl 50. In such an instance, when the pawl 50 is released, the shaft is held by the crank handle 37 against rotation, while the load normally becomes effective to rotate the pinion 40 slightly on the shaft 30 in a clamping direction so as to thereby cause the pinion 40 to move in a right hand direction, Figs. 2 and 4. This effects a clamping of the friction discs and such clamping forces cause a braking action which stops the pinion 40 after but a slight rotation in a lowering or unwinding direction. In the event that the load is relatively great, it is usually necessary to rotate the handle in a winding direction in order to relieve the force on the safety pawl 50, and when this is done, the parts move to the clamped relation shown in Fig. 3. This relation thus conditions the apparatus for braking operation as the load is lowered.

In such lowering operation the handle is rotated in a lowering or unwinding direction, thereby to progressively tend to release the clutches that act on the ratchet 45, and as this releasing action takes place, the load acts on the pinion 40 so as to cause the same to follow the unwinding rotative movements of the handle. Hence the friction discs are effective to control the lowering or unwinding movement of the pinion 40, and but little force is required in operating the handle. Moreover, this force must be positive in an unwinding direction, and the control or restraining forces exerted on the pinion are afforded by the friction clutch means in accordance with the load.

In prior winches and hoists made under and in accordance with the aforesaid Benson patent, the operation of the safety brake that is described in such Benson patent has in most instances been such as to afford complete safety of operation of the apparatus, but it has been found that in the hands of a careless or unskilled operator the safety brake may in effect be inadvertently disabled in the course of the release operation that has been above described. In other words, the releasing of the various clutch elements by movement of the pinion or a connected part axially of the shaft may in the prior structures be carried to such an extent as to cause the pinion or the related element to be locked to the operating shaft so firmly that the load applied to the pinion from the drum of the winch will be unable to rotate the pinion relative to the shaft and back to its clamping or braking position, and hence the full force of the load will be transmitted to the handle so as to break the operator's grip. In my aforesaid copending application, means were disclosed whereby such undesired locking of the pinion to the operating shaft is positively eliminated, and such means were effective to limit the rotating movement of the pinion with respect to the operating shaft that endwise wedging movement of the pinion against the related or opposed end surface of the limiting collar on the operating shaft was prevented. Under the present invention, through the use of cam surfaces 40C and 41C, the need for such a limiting means is eliminated, since the pinion 40 is positively actuated only in a brake-applying direction on right hand rotation.

By reason of the use of the cam surfaces 40C and 41C to actuate the gear 40 in a brake-applying direction, it is possible to afford opposed wearing surfaces of relatively large area so that these surfaces are not subjected to wear to an objectionable extent. Moreover, through the use of one-way cam surface actuating means for the brake, it becomes possible to readily and easily adjust the stroke of the pinion 40 along the shaft 30, and this in turn enables composition friction material or the like to be employed in the brake. Such composition friction material enables smooth braking operation to be attained, and the desirable operating characteristics thus attained may be maintained throughout the entire wearing range of the friction discs merely by making the necessary adjustments of the cam head 41. The cam surfaces 40C and 41C are of course protected and housed by the cylindrical wall 41W so that falling pieces of building material cannot interfere with the operation of the cam surfaces.

In the use of the winch of the present invention, the reversible handle may be located in the safety position of Fig. 1 so as to engage the frame of the winch to prevent unwinding movement thereof. In addition, the safety pawl 50 may be located in its safety position of Fig. 1 and this affords a second safety feature. The friction brake arrangement that is afforded by the cams 40C and 41C affords a third safety feature, and since this cam arrangement may be readily adjusted, the use of composition friction material in the brake is rendered possible.

Thus, while I have illustrated and described the preferred embodiment of my invention, it is to be understood that this is capable of variation and modification and I therefore do not wish to be limited to the precise details set forth, but desire to avail myself of such changes and alterations as fall within the purview of the following claims.

I claim:

1. In a hand operated winch or the like, a frame, an operating shaft rotatably mounted in said frame and having an operating means associated therewith whereby said shaft may be oppositely rotated selectively in lifting or lowering directions, a ratchet rotatably mounted on said shaft, a pawl pivoted on said frame and normally engaged with said ratchet to hold the same against rotation in said lowering direction, a pinion rotatably mounted on said shaft on one side of said ratchet, a cam head member fixed in a non-rotative relation on said shaft at the end of said pinion opposite from said ratchet, individual friction clutch means disposed between said pinion and said ratchet and between said ratchet and said shaft, a sleeve member fixed to said pinion and extended toward said cam head member, cam elements formed on said members and acting to force said pinion toward said ratchet when said shaft is rotated in a lifting direction relative to said pinion to engage said friction clutch means and thus connect said shaft, said ratchet and said pinion as a unit, a protecting sleeve formed on one of said members and extending axially therefrom so as to enclose and protect said cam surfaces, and adjustable abutment means on said shaft for adjusting the endwise position of said cam head member on said shaft.

2. In a hand operated winch or the like, a frame, an operating shaft rotatably mounted in said frame and having an operating means associated therewith whereby said shaft may be oppositely rotated selectively in lifting or lowering directions, a ratchet rotatably mounted on said shaft, a pawl pivoted on said frame and normally engaged with said ratchet to hold the same against rotation in said lowering direction, a pinion member mounted on said shaft for rotation relative thereto and located on one side of said ratchet, a cam head member fixed in a non-rotative relation on said shaft at the end of said pinion member opposite from said ratchet, individual friction clutch means disposed between said pinion member and said ratchet and between said ratchet and said shaft, cooperating cam elements formed on the respective adjacent ends of said members and operatively engaging each other at at least three equally spaced points spaced about the axis of said shaft to force said pinion with a balanced action in an endwise direction toward said ratchet when said shaft is rotated in a lifting direction relative to said pinion to engage said friction clutch means and thus connect said shaft, said ratchet and said pinion as a unit, and adjustable abutment means on said shaft for adjusting the endwise position of said cam head member on said shaft.

MATTHIAS F. SASGEN.

REFERENCES CITED

The following references are of record in the file of this patent:

UNITED STATES PATENTS

| Number | Name | Date |
|---|---|---|
| 40,046 | Jones | Sept. 22, 1863 |
| 1,849,383 | Richardson | Mar. 15, 1932 |
| 2,424,910 | Benson | July 29, 1947 |